US00RE37372B1

(19) United States
(12) Reissued Patent
Smith

(10) Patent Number: US RE37,372 E
(45) Date of Reissued Patent: Sep. 18, 2001

(54) CONVERTIBLE WORK CREEPER, SEAT AND PLATFORM

(76) Inventor: Craig S. Smith, 1409 Corbett La., Orlando, FL (US) 32806

(21) Appl. No.: 09/473,825

(22) Filed: Dec. 22, 1999

Related U.S. Patent Documents

Reissue of:
(64) Patent No.: 5,707,067
Issued: Jan. 13, 1998
Appl. No.: 08/585,697
Filed: Jan. 16, 1996

(51) Int. Cl.[7] ..... B25H 5/00
(52) U.S. Cl. ..... 280/32.6
(58) Field of Search ..... 280/32.6

(56) References Cited

U.S. PATENT DOCUMENTS

| | | | |
|---|---|---|---|
| D. 285,018 | 8/1986 | Quinonez | D34/23 |
| D. 289,815 | 5/1987 | Quinonez | D34/23 |
| 1,327,103 | 1/1920 | Knowles . | |
| 2,124,389 | 7/1938 | Woelfer, Jr. | 280/32.6 |
| 2,595,783 | 5/1952 | Griffin | 280/32.6 |
| 2,595,784 | 5/1952 | Griffin et al. | 280/32.6 |
| 2,611,417 | 9/1952 | Henry et al. | 280/32.6 |
| 2,668,964 | 2/1954 | Simmons | 280/32.6 |
| 2,692,636 | 10/1954 | Morrison | 280/32.6 |
| 2,804,127 | 8/1957 | Whittingham | 280/32.6 |
| 2,843,391 | 7/1958 | Pelletier | 280/32.6 |
| 4,025,106 | 5/1977 | Kyte | 297/16 |
| 4,471,969 | 9/1984 | Zabala et al. | 280/30 |
| 4,580,799 | 4/1986 | Quinonez | 280/32.6 |
| 4,895,380 | 1/1990 | Brooks et al. | 280/32.6 |
| 4,957,302 | 9/1990 | Maxwell | 280/32.6 |
| 5,072,955 | 12/1991 | Holland et al. | 280/32.5 |
| 5,451,068 | 9/1995 | Shockley | 280/32.6 |
| 5,577,744 | 11/1996 | Parks | 280/32.6 |

FOREIGN PATENT DOCUMENTS

| | | | |
|---|---|---|---|
| 283330 | 1/1928 | (GB) | 280/32.6 |
| 2251828 | 7/1992 | (GB) | 280/32.6 |

*Primary Examiner*—Kevin Hurley
(74) *Attorney, Agent, or Firm*—Flint & Kim, P.A.

(57) ABSTRACT

A creeper cum work seat has two end platforms (1, 5) in sliding attachment to slide rods (4, 35, 36) in slideways (3, 6) with which the two end platforms can be slid apart to opposite ends of a central platform (7) to form a full-length creeper in creeper mode (11). The central platform becomes a work seat and the two end portions become a shelf platform under the work seat when the two end platforms are slid edge-to-edge in a seat mode(10). Seat-support members (12, 13) are attached pivotally to the central platform and to the two end platforms to support the central platform as a seat in a seat mode and to position the central portion between the two end platforms in a creeper mode.

45 Claims, 4 Drawing Sheets

CONVERTIBLE WORK CREEPER, SEAT AND PLATFORM

Matter enclosed in heavy brackets [ ] appears in the original patent but forms no part of this reissue specification; matter printed in italics indicates the additions made by reissue.

BACKGROUND OF THE INVENTION

This invention relates to mechanic creepers and work seats and in particular to a caster-supported creeper that is convertible to a seat with a shelf platform beneath it.

Various creepers with body-support pads on easters have been devised and are being marketed for lying on to work under vehicles and low structural protrusions. Separately, work seats and tool platforms are being produced and marketed for working around low portions of vehicles, car wheels, low plumbing fixtures, low portions of cabinets and low areas of other objects that can require strenuous back-bending without a low work seat. Some known creepers are foldable and some work seats on casters and having tool platforms are foldable. None are known, however, to be convertible between creepers and work seats with a tool platform in a manner taught by this invention.

Examples of creepers and work seats that are different from this invention are described in the following patent documents. British Patent Application Number GB 2,251, 828 A by Moghal dated Jul. 22, 1992, described as caster-supported work seat with tool platforms at opposite sides. U.S. Pat. No. 5,072,955, issued to Holland, et al. on Dec. 17, 1991, taught a caster-supported work platform with a central portion that was adjustable in height with inwardly folding braces that were operated with a threaded shaft similar to some car jacks currently in use. U.S. Pat. No. 4,957,302, issued to Maxwell on Sep. 18, 1990, taught a caster-supported work seat that was pivotal in a cradle for height adjustment. U.S. Pat. No. 4,580,799, issued to Quinonez on Apr. 8, 1986, taught a caster-supported creeper with one portion foldable on top of another portion for use as a moveable stool. U.S. Pat. No. 4,471,969, issued to Zabala, et al. on Sep. 18, 1984, taught a caster-supported photography platform with legs that folded down for conversion to a seat or higher photography platform. U.S. Pat. No. 2,611, 417, issued to Henry, et al. on Sep. 23, 1952, taught a caster-supported creeper with end portions that were foldable to leg-like positions to raise either or both ends of a central portion or foldable under the central portion for a shorter creeper. British Patent Number 283,330 issued to Bruce on Jan. 12, 1928, taught a caster-supported creeper with a headrest that was pivotal downward to function as a leg to hold a head end of the creeper in position above casters to prevent movement of the creeper in relation to a selected work area.

SUMMARY OF THE INVENTION

In light of need for improved worker-support means in low portions of structures, objects of this invention are to provide a creeper with work seat which:

Is convertible between creeper and seat modes;

Has a tool platform in work seat mode;

Has a length-adjustment headrest in creeper mode;

Rides on casters in both modes;

Is sturdy for sitting, standing and prone positions of use; and

Is easily portable and storable.

This invention accomplishes these and other objectives with a convertible creeper with work seat having two end platforms in sliding attachment to slide rods in slideways with which the two end platforms can be slid apart to opposite ends of a central platform to form a full-length creeper in creeper mode. The central platform becomes a work seat and the two end portions become a shelf platform under the work seat when the two end platforms are slid edge-to-edge in work-seat mode. Seat-support reds are attached pivotally to the central platform and to the two end platforms to support the central platform as a seat in work-seat mode and to position the central portion between the two end platforms in creeper mode. The invention can also be used as a standing platform, like a stool, by standing on the seat when the invention is in a locked-wheel stationary position.

The above and other objects, features and advantages of the present invention will become apparent to those skilled in the art upon a reading of the following detailed description when taken in conjunction with the drawings wherein there is shown and described an illustrative embodiment of the invention.

BRIEF DESCRIPTION OF DRAWINGS

This invention is described by appended claims in relation to description of a preferred embodiment with reference to the following drawings which are described briefly as follows:

DESCRIPTION OF PREFERRED EMBODIMENT

Figure 1:
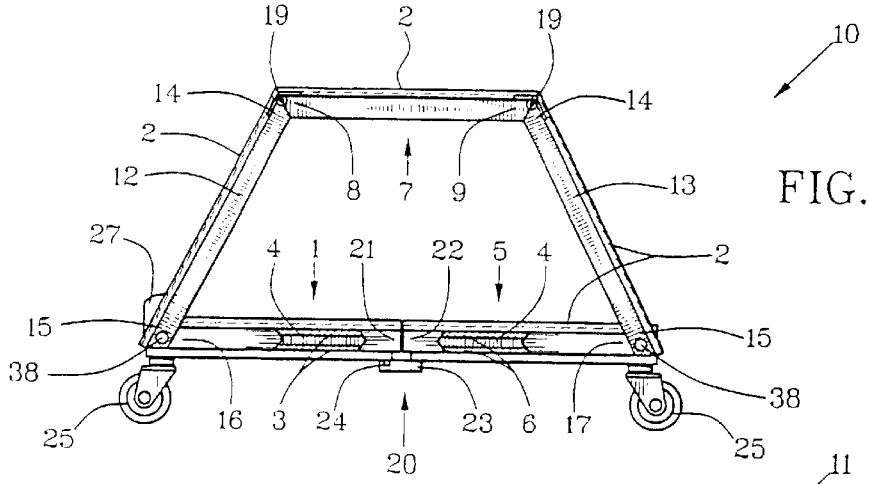
FIG. 1 is a partially cutaway side view in a seat mode.

Reference is made first to FIGS. 1–6 primarily and to other FIGS. as indicated. A first-end platform 1 has a support surface 2 on a top portion and a first-end slideway 3 vertically below the support surface 2. In this embodiment, the first-end slideway 3 has two sections, one of which houses a slide member which is a rectangular slide rod 4 proximate one side and a separate rectangular slide rod 4 proximate an opposite side of the first-end platform 1. Similarly at an opposite end, a second-end platform 5 also has a support surface 2 on a top portion, a second-end slideway 6 vertically below its support surface 2 and a rectangular slide rod 4 in each of two opposite-side sections of the second-end slideway 6. A central platform 7 with a support surface 2 has a first end 8 and a second end 9.

The central platform 7 is convertible to a seat in a seat mode 10 depicted in FIGS. 1, 4–5, 7 and 10. Optionally as desired for various use conditions, the central platform 7 is convertible to a central portion of a creeper in a creeper mode 11 depicted in FIGS. 2–3, 6, 8–9 and 11–12. Interchangeability between a seat mode 10 and a creeper mode 11 of the creeper seat is accomplished with a working relationship of hinged seat-support members and slide members. A variety of slide members, slideways, seat-support members and related components in lieu of those preferred and illustrated can be employed.

At least one first seat-support member 12 and at least one second seat-support member 13 both have a seat end 14 of seat-support members and a creeper end 15 of seat-support members. The seat end 14 of the first seat-support member 12 is hinged to the first end 8 of the central platform 7 and the seat end 14 of the second seat-support member 13 is hinged to the second end 9 of the central platform 7. The creeper end 15 of the first seat-support member 12 is hinged to an outside end 16 of the first-end platform 1 and the creeper end 15 of the second seat-support member 13 is hinged to an outside end 17 of the second-end platform 5.

Figure 4:
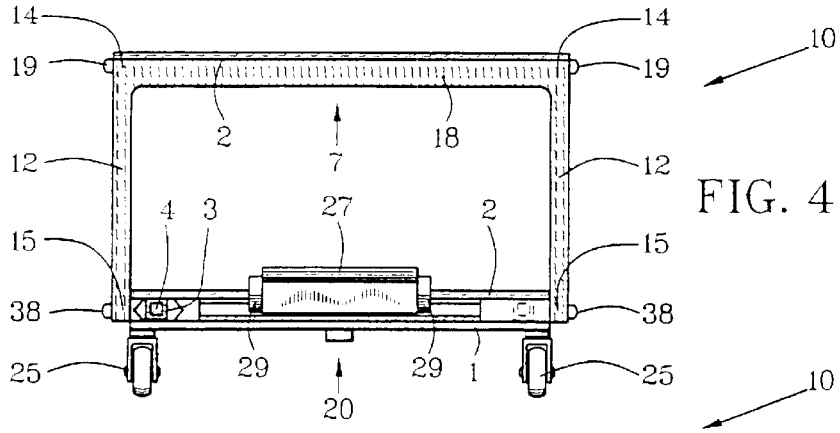
FIG. 4 is a partially cutaway head-end view in a seat mode.
Figure 5:
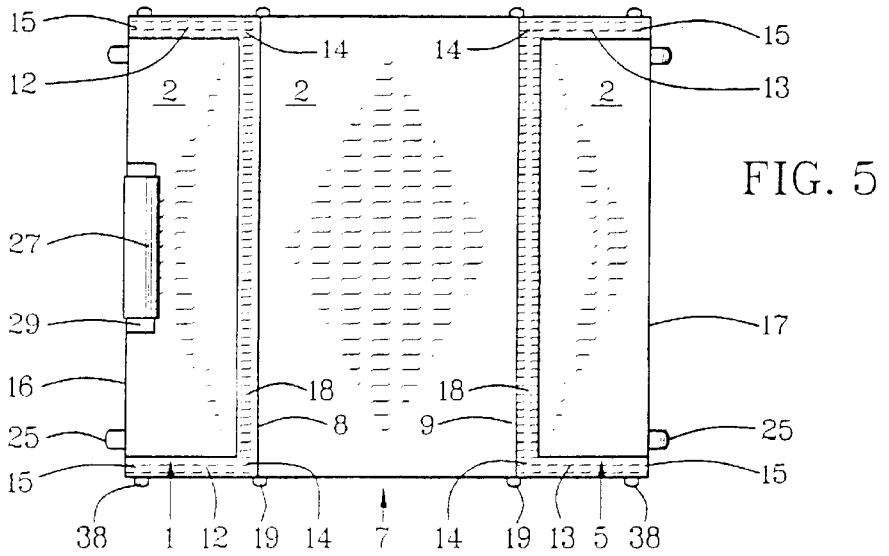
FIG. 5 is a top view in a seat mode.
Figure 6:
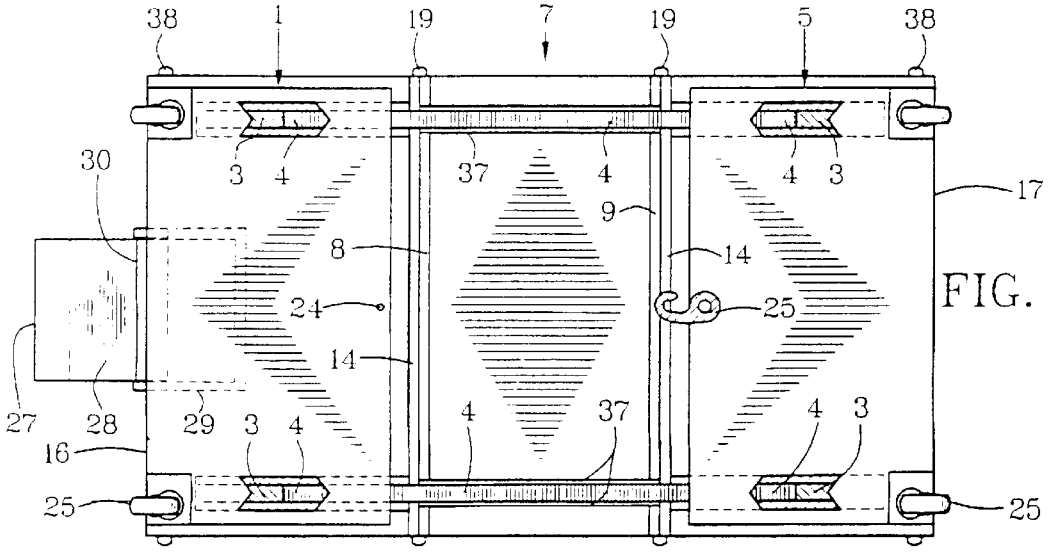
FIG. 6 is a partially cutaway bottom view in a creeper mode.
Figure 7:
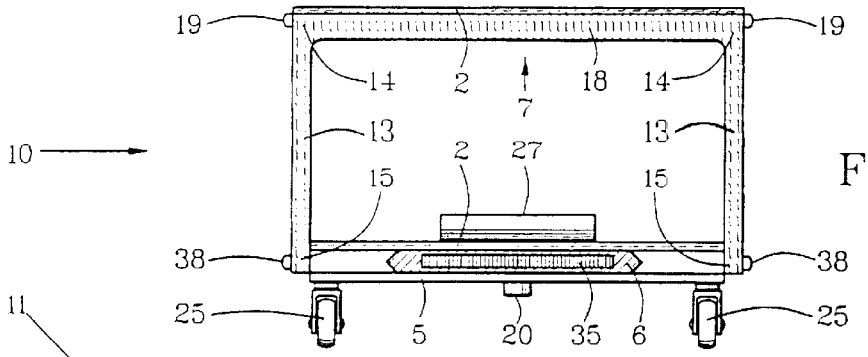
FIG. 7 is a partially cutaway foot-end view of an embodiment with a single slide member in a seat mode.
Figure 8:
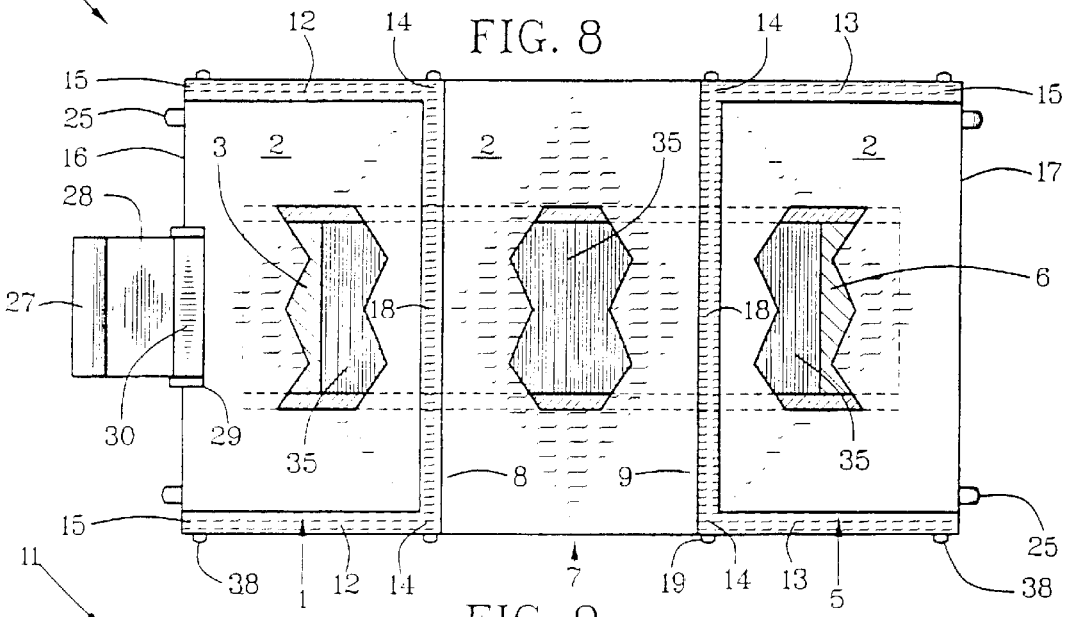
FIG. 8 is a partially cutaway top view of an embodiment with a single slide member in a creeper mode.
Figure 9:
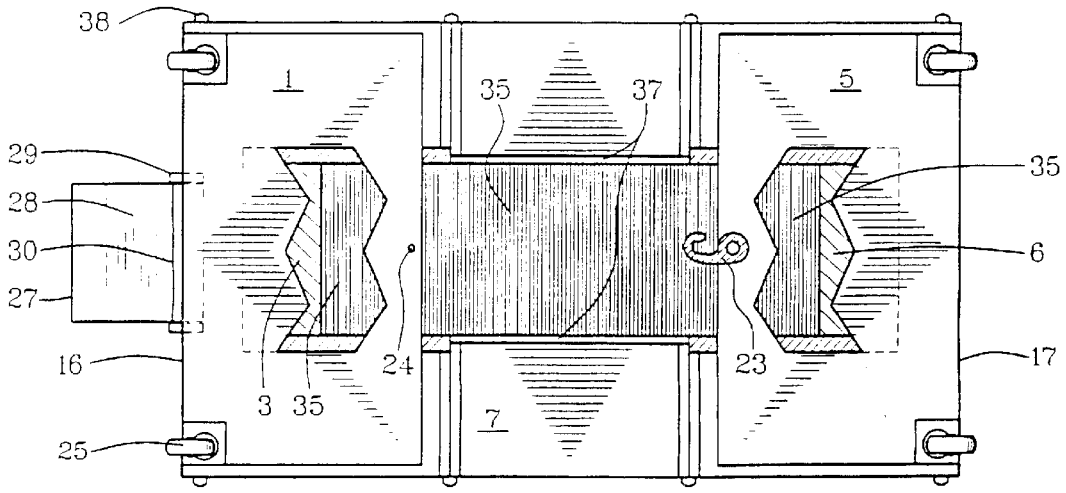
FIG. 9 is a partially cutaway bottom view of an embodiment with a single slide member in a creeper mode.
Figure 10:
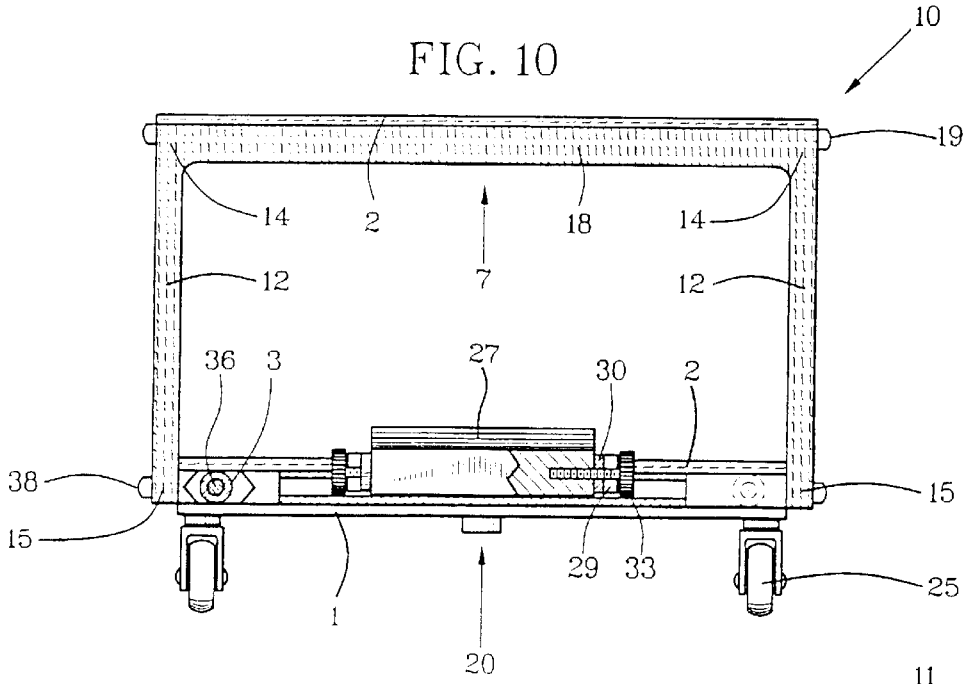
FIG. 10 is a slightly enlarged partially cutaway head-end view of an embodiment with two cylindrical slide members in a seat mode.

As depicted by end-views in FIGS. 4, 7 and 10, the first seat-support member 12 can be a pair of separate legs that are joined by a leg brace 18. The leg brace 18 also provides hinge-attachment surface for preferably a side-to-side full-length seat hinge that is represented by a seat-hinge bolt head 19 for whatever type of seat hinge is employed. Likewise, second seat-support member 13 can be a pair of separate legs that are joined by a leg brace 18 that provides the same functions. Optionally, the first seat-support member 12 and the second seat-support member 13 can be separate pairs of separate legs that are not joined by leg braces 18. For either option, there are a total of four legs at creeper ends 15 of seat-support members 12 and 13.

The at-least-one slide member, represented by the rectangular slide rods 4 in FIGS. 1–4 and 6, is sized and shaped to slide with design snugness in the at-least-one first-end slideway 3 and the at-least-one second-end slideway 6 shown in the same FIGS. 1–4 and 6. For a creeper mode 11 depicted in FIGS. 2–3, 6, 8–9 and 11–12, the rectangular slide reds 4, or other at-least-one slide member, have a length to accommodate a distance of sliding separation of the first-end platform 1 and the second-end platform 5 for positioning the central platform 7 designedly between the first-end platform 1 and the second-end platform 5 horizontally with the first-end platform 1, the central platform 7 and the second-end platform 5 juxtaposed edge-to-edge as a body-support platform for a creeper. For a seat mode 10 depicted in FIGS. 1, 4, 7 and 10, the at-least-one first seat-support member 12 and the at-least-one second seat-support member 13 have design lengths to support the central platform 7 as a seat in a horizontal attitude vertically above the first-end platform 1 and the second-end platform 5 with the first-end platform 1 and the second-end platform 5 juxtaposed edge-to-edge as a shelf platform vertically below the central platform 7 as a work seat.

A seat-mode latch 20 maintains the first-end platform 1 and the second-end platform 5 juxtaposed detachably in an edge-to-edge relationship of an inside end 21 of the first-end platform 1 and an inside end 22 of the second-end platform 5 for the seat mode 10. A variety of fasteners can be employed. Preferably, the seat-mode latch 20 has a grasping latch member 23 that latches onto a rigid latch member 24. The seat-mode latch 20 is shown in a closed mode in seat-mode FIGS. 1, 4, 7 and 10. An open mode of the seat-mode latch 20 is depicted in creeper-mode FIGS. 2, 6, 9 and 11.

In the seat mode 10, the first-end platform 1 and the second-end platform 5 provide a shelf platform on which to place tools and items being worked with in a sitting mode near low work areas. Also, the seat mode 10 comprised of two platforms 1 and 5 for a shelf platform and one platform 7 for a seat, has a relatively wide base for stability. Both modes are convenient, easy to use and advantageous for a wide variety of both commercial and residential applications.

Support means on bottoms of at least the outside end 16 of the first-end platform 1 and the outside end 17 of the second-end platform 5 can be provided for wheeled and/or placeable mobility, the latter particularly desirable if one wants to use the invention like a stool by standing on the support surface 2. The support means are preferably casters 25 of a desired type as shown in all of FIGS. 1–12. Legs 26 that are optionally fixed, pivotal or detachable also can be employed separately or in design combination with the easters 25 in a support relationship shown in FIG. 11.

A headrest 27 can be positioned on the outside end 16 of the first-end platform 1 to comprise a head end of the creeper mode 10. The headrest 27 can be attached directly to the outside end 16 of the first-end platform 1 or positioned on a headrest extension 28 that slides in a headrest slideway 29 as a selectively variable-length extension of the end platform on which the headrest slideway 29 is positioned. Variable-length extension of an end platform is a particularly effective variable-length extension of the creeper mode 11 because it is relatively narrow to provide greater access to and vision of items in a vicinity of a worker's head.

The headrest extension 28 can be attached to a headrest base 30 that is pivotal arcuately for height-positioning of the headrest 27 with the headrest extension 28 in an extended mode. A variety of pivotal means with a variety of position-support means are foreseeable. A preferred position-support means is a slideway ratchet 31 with ratchet slots attached to the outside end 16 of the first-end platform 1 as illustrated in FIG. 12. A ratchet tongue member 32 that is movably attached to the headrest extension 28 can be engaged selectively with the ratchet slots. Foreseeable also as shown in FIG. 10 is a threaded-axle knob 33 that locks the headrest base 30 into a select angular relationship to a headrest slideway 29 that is slotted or channeled horizontally. Also optional can be a headrest leg 34, as shown in FIG. 11, that can be pivoted to a desired perpendicularly for height selection of the headrest 27 and maintained there with a variety of convenient pivot-control means.

Figure 2:
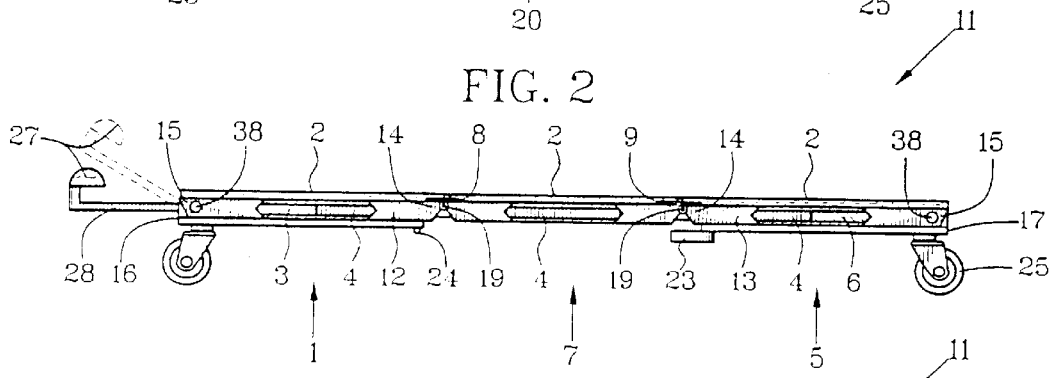
FIG. 2 is a partially cutaway side view in a creeper mode.
Figure 3:
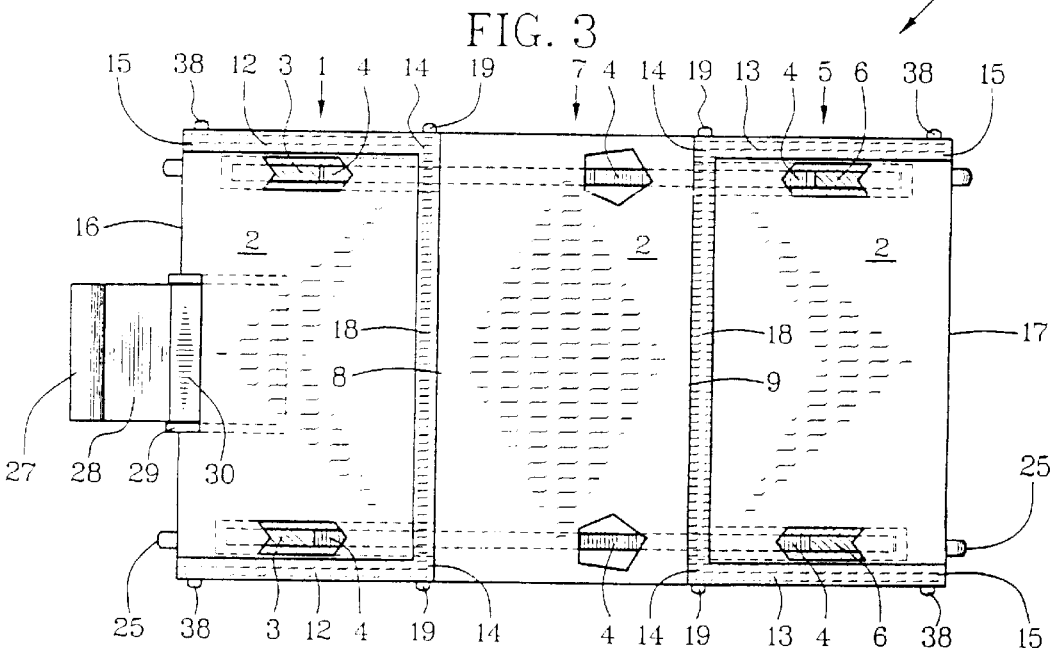
FIG. 3 is a partially cutaway top view in a creeper mode.
Figure 11:
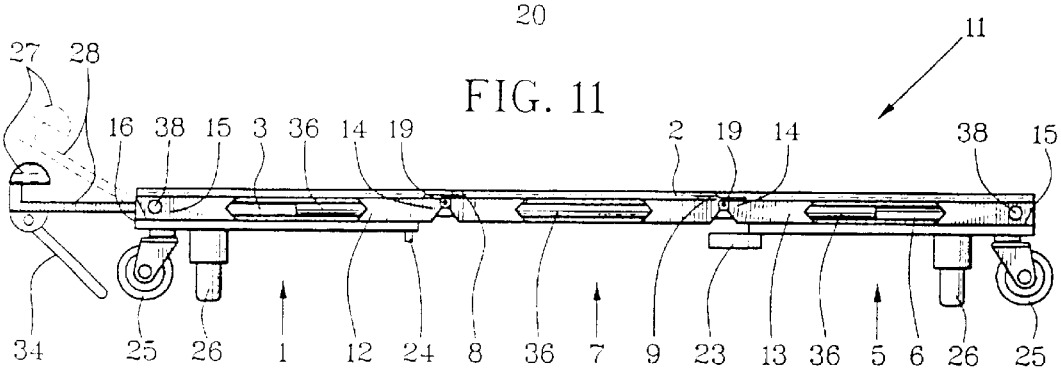
FIG. 11 is a slightly enlarged partially cutaway side view of an embodiment with two cylindrical slide members in a creeper mode.
Figure 12:
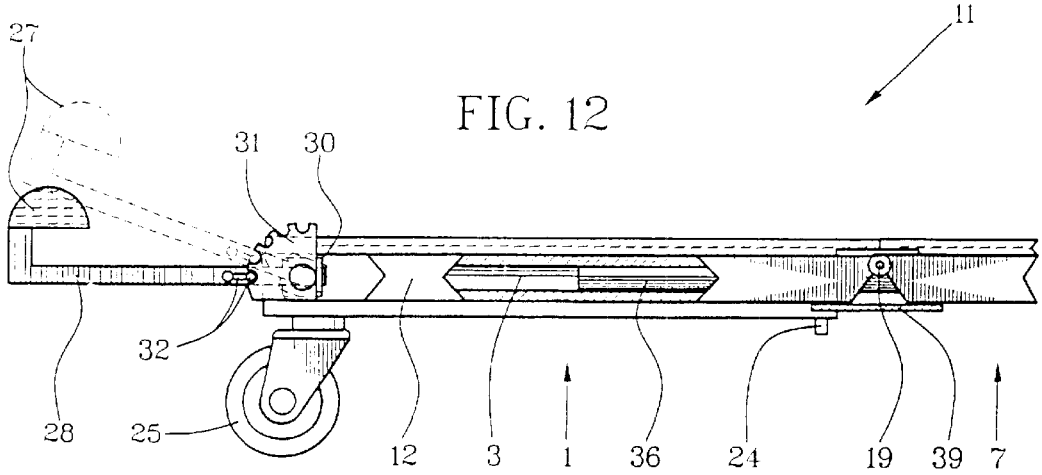
FIG. 12 is an enlarged partially cutaway fragmentary side view of a head end of an embodiment with two cylindrical slide members in a creeper mode having a ratchet means on a creeper-length extension with a headrest.

In a creeper mode 11, the central platform 7 rests on slide members such as rectangular slide rods 4 shown in FIGS. 1–3, on a rectangular plate 35 as shown in FIGS. 7–10, or on cylindrical slide rods 36 as shown in FIGS. 10–12. First-end slideways 3 and second-end slideways 6 are sized and shaped to receive whatever size and shape of slide member is employed. Bottoms of the central platform 7 are provided with slide channels 37 that are sized and shaped to receive respective slide members as shown in the FIG. 6 bottom view for rectangular slide rods 4 and in FIG. 9 bottom view for the rectangular plate 35. Slide channels 37 for receiving cylindrical slide rods 36 are not shown separately because they could be similar to those used for the rectangular slide rods 4. In FIG. 3, rectangular slide rods 4 are shown in a cutaway below the support surface 2 of the central platform 7 and in FIG. 8, the rectangular plate 35 is shown in a cutaway below the support surface 2 of the central platform 7.

A problem with the rectangular plate 35 as a slide member is that it occupies space that can be used for a headrest extension 28. Either or both the rectangular plate 35 and the headrest extension 28 must be modified or their positioning modified. Otherwise, the rectangular plate 35 is a viable option for an embodiment of this invention.

Means for hinged or pivotal attachment of creeper ends 15 of the seat-support members 12 and 13 to the outside ends 16 and 17 of the first-end platform 1 and the second-end platform 5 is represented by a bottom hinge-bolt head 38. It is representative of a variety of hinge or axle means that can be used.

In some structures of the seat-support members 12 and 13 where they are hinged to the central platform 7, there is an opening in the creeper mode 11 that closes in the seat mode 10 with a nutcracker effect that could cause injury or hurt to a user's finger or other body part when changing from creeper to seat modes. To avoid this for such constructions, a flexible pinch guard 39 can be positioned on bottom edges of the central platform 7 and on bottom edges of the seat-support members 12 and 13 where they join as illustrated in FIG. 12.

A new and useful convertible work creeper, seat and platform having been described, all such modifications, adaptations, substitutions of equivalents, combinations of parts, pluralities of parts, applications and forms thereof as described by the following claims are included in this invention.

Having thus described my invention, I claim:

1. A convertible work creeper, seat and platform comprising:

a first-end platform and a second-end platform having slide means positioned on at least one common slide member that is parallel to top surfaces of the first-end platform and the second-end platform and has a slide-member length to allow horizontal travel of the first-end platform and the second-end platform between design positions of separation and juxtaposed edge-to-edge positioning of the first-end platform and the second-end platform;

a central platform that is positional between the first-end platform and the second-end platform with the first-end platform and the second-end platform positioned at design extremities of separation on the at-least-one common slide member, such that the first-end platform, the central platform and the second-end platform juxtaposed edge-to-edge are a creeper platform in a creeper mode of the creeper cum seat;

first-end legs of the central platform having top ends of the first-end legs hinged to a first side of the central platform and having bottom ends of the first-end legs hinged to an outside end of the first-end platform;

second-end legs of the central platform having top ends of the second-end legs hinged to a second side of the central platform and having bottom ends of the second-end legs hinged to an outside end of the second-end platform, such that the central platform is positional vertically above the first-end platform and the second-end platform juxtaposed edge-to-edge as a shelf platform with the first-end platform and the second-end platform slid to a seat mode of the creeper cum seat; and mobile means on bottoms of outside ends of the first-end platform and the second-end platform.

2. A convertible work creeper, seat and platform as described in claim 1 wherein:

the mobile means include casters.

3. A convertible work creeper, seat and platform as described in claim 1 and further comprising:

a creeper-length extension on a slide means attached telescopically to an outside end of an end platform.

4. A convertible work creeper, seat and platform as described in claim 3 and further comprising:

a headrest on an outside end of the creeper-length extension.

5. A convertible work creeper, seat and platform as described in claim 4 and further comprising:

a hinge means with which the creeper-length extension is pivotal selectively to a desired height of the headrest in relationship to the end platform;

a ratchet means attached to the end platform; and a ratchet-tongue attached to the creeper-length extension and positional in the ratchet means in ratchet-control relationship of pivotal positioning of the creeper-length extension.

6. A convertible work creeper, seat and platform as described in claim 1 and further comprising:

an end fastener in fastening relationship between an inside end of the first-end platform and an inside end of the second-end platform with the creeper cum seat in a seat mode.

7. A convertible work creeper, seat and platform as described in claim 1 wherein:

the first-end platform, the second-end platform and the central platform are padded.

8. A convertible work creeper, seat and platform comprising:

a first-end platform having a support surface on a top portion and at least one first-end slideway vertically below the support surface on the first-end platform;

a second-end platform having a support surface on a top portion and at least one second-end slideway vertically below the support surface on the second-end platform;

at least one slide member having a first-end portion and a second-end portion of the at-least-one slide member;

the first-end portion of the at-least-one slide member being positioned in the first-end slideway of the first-end platform;

the second-end portion of the at-least-one slide member being positioned in the second-end slideway of the second-end platform;

a central platform having a support surface, a first end and a second end of the central platform;

at least one first seat-support member having a seat end and a creeper end of the at-least-one first seat-support member;

at least one second seat-support member having a seat end and a creeper end of the at-least-one second seat-support member;

the seat end of the at-least-one first seat-support member being hinged to the first end of central platform;

the seat end of the at-least-one second seat-support member being hinged to the second end of central platform;

the creeper end of the at-least-one first seat-support member being hinged to an outside end of the first-end platform;

the creeper end of the at-least-one second seat-support member being hinged to an outside end of the second-end platform;

the at-least-one slide member being sized and shaped to slide with design snugness in the at-least-one first-end slideway and in the at-least-one second slideway;

the at-least-one slide member having a length to accommodate a distance of sliding separation of the first-end platform and the second-end platform for positioning the central platform designedly between the first-end platform and the second-end platform horizontally with the first-end platform, the central platform and the second-end platform juxtaposed side-by-side as a body-support platform in a creeper mode; and the at-least-one first seat-support member having a design length and the at-least-one second seat-support member having design lengths to support the central platform as a seat in a horizontal attitude vertically above the first-end platform and the second-end platform with the first-end platform and the second-end platform juxtaposed edge-to-edge as a shelf platform vertically below the central platform as a seat in a seat mode of the creeper cum seat.

9. A convertible work creeper, seat and platform as described in claim 8 and further comprising:

at least one seat-mode latch having latching attachment of the first-end platform to the second-end platform for maintaining the first-end platform and the second-end platform juxtaposed detachably in edge-to-edge relationship in a seat mode.

10. A convertible work creeper, seat and platform as described in claim 8 and further comprising:

support means on bottoms of at least the first-end platform and the second-end platform.

11. A convertible work creeper, seat and platform as described in claim 10 wherein:

the support means are casters.

12. A convertible work creeper, seat and platform as described in claim 10 and further comprising:

at least one leg positional on an end of at least one end platform.

13. A convertible work creeper, seat and platform as described in claim 8 and further comprising:

a headrest positioned proximate an end of a top surface of an end platform.

14. A convertible work creeper, seat and platform as described in claim 8 and further comprising:

a headrest slideway positioned proximate an outside end of an end platform;

the headrest slideway being linear to the end platform;

a headrest extension in linearly slideable contact with the headrest slideway; and the headrest extension being a selectively variable-length extension of the end platform on which the headrest slideway is positioned.

15. A convertible work creeper, seat and platform as described in claim 14 wherein:

the end platform is a first-end platform; and a headrest is positioned on an extendable end of the headrest extension.

16. A convertible work creeper, seat and platform as described in claim 15 wherein:

the headrest slideway is attached pivotally to the end of the end platform.

17. A convertible work creeper, seat and platform as described in claim 16 and further comprising:

a slideway ratchet having ratchet slots attached to the end platform;

a ratchet tongue member attached to the headrest extension; and the ratchet tongue member being engageable selectively with the ratchet slots to support the headrest extension at a select angle with the headrest positioned at a select height vertically higher than the end platform.

18. A convertible work creeper, seat and platform as described in claim 8 wherein:

the at-least-one slide member is a rectangular plate having design width, length and thickness;

the first-end slideway has an internal periphery that is rectangular with a size and shape to receive the first-end portion of the at-least one slide member with designedly sliding snugness;

the second-end slideway has an internal periphery that is rectangular with a size and shape to receive the second-end portion of the at-least one slide member with designedly sliding snugness; and the at-least-one first-end slideway is positioned centrally on the first-end platform; and the at-least-one second-end slideway is positioned centrally on the second-end platform, such that the central platform rests on the at-least-one slide member when the first-end platform and the second-end platform are slid apart in a creeper mode and the central platform is positioned vertically above the at-least-one slide member when the first-end platform and the second-end platform are slid together and positioned edge-to-edge in a seat mode.

19. A convertible work creeper, seat and platform as described in claim 8 wherein:

the at-least-one slide member is a pair of slide rods comprising a first slide rod and a second slide rod having design outside peripheries and design lengths;

the first-end slideway is a pair of rod slideways comprising a first-side rod slideway with an internal periphery that is sized and shaped to receive a first-end portion of the first slide rod with designedly sliding snugness and comprising a second-side rod slideway with an internal periphery that is sized and shaped to receive a first-end portion of the second slide rod with designedly sliding snugness;

the second-end slideway is a pair of rod slideways comprising a first-side rod slideway with an internal periphery that is sized and shaped to receive a second-end portion of the first slide rod with designedly sliding snugness and comprising a second-side rod slideway with an internal periphery that is sized and shaped to receive a second-end portion of the second slide rod with designedly sliding snugness;

the first-side rod slideway on the first-end platform is positioned proximate a first side of the first-end platform;

the second-side rod slideway on the first-end platform is positioned proximate a second side of the first-end platform;

the first-side rod slideway on the second-end platform is positioned proximate a first side of the second-end platform; and the second-side rod slideway on the second-end platform is positioned proximate a second side of the second-end platform.

20. A convertible work creeper, seat and platform as described in claim 8 wherein:

the at-least-one first seat-support member is a pair of first-end seat-support members comprising a central-platform first-end first-side leg and a central-platform first-end second-side leg;

the central-platform first-end first-side leg and the central-platform first-end second-side leg having design outside peripheries and design lengths;

the at-least-one second seat-support member is a pair of second-end seat-support members comprising a central-platform second-end first-side leg and a central-platform second-end second-side leg;

the central-platform second-end first-side leg and the central-platform second-end second-side leg having design outside peripheries and design lengths;

the central-platform first-end first-side leg has a leg-top end hinged to the central platform at a position proximate a corner of a first end and a first side of the central platform;

an axis of hinged attachment of the leg-top end of the central-platform first-end first-side leg to the proximate corner of the first end and the first side of the central platform being parallel to an end of the central platform;

the central-platform first-end first-side leg has a leg-bottom end hinged to the first-end platform at a position proximate a corner of a first end and a first side of the first-end platform; and an axis of hinged attachment of the leg-bottom end of the central-platform first-end first-side leg to the proximate corner of the first end and the first side of the first-end platform being parallel to an end of the central platform.

21. A convertible work creeper, seat and platform as described in claim 19 wherein:

the at-least-one first seat-support member is a pair of first-end seat-support members comprising a central-platform first-end first-side leg and a central-platform first-end second-side leg;

the central-platform first-end first-side leg and the central-platform first-end second-side leg having design outside peripheries and design lengths;

the at-least-one second seat-support member is a pair of second-end seat-support members comprising a central-platform second-end first-side leg and a central-platform second-end second-side leg;

the central-platform second-end first-side leg and the central-platform second-end second-side leg having design outside the peripheries and design lengths;

the central-platform first-end first-side leg has a leg-top end hinged to the central platform at a position proximate a corner of a first end and a first side of the central platform;

an axis of hinged attachment of the leg-top end of the central-platform first-end first-side leg to the proximate corner of the first end and the first side of the central platform being parallel to an end of the central platform;

the central-platform first-end second-side leg has a leg-top end hinged to the central platform at a position proximate a corner of a first end and a second side of the central platform;

an axis of hinged attachment of the leg-top end of the central-platform first-end first-side leg to the proximate corner of the first end and the first side of the central platform being parallel to an end of the central platform;

the central-platform first-end first-side leg has a leg-bottom end hinged to the first-end platform at a position proximate a corner of an outside end and a first side of the first-end platform;

an axis of hinged attachment of the leg-bottom end of the central-platform first-end first-side leg to the proximate corner of the inside end and the first side of the first-end platform being parallel to an end of the central platform;

the central-platform first-end second-side leg has a leg-bottom end hinged to the first-end platform at a position proximate a corner of an outside end and a second side of the first-end platform;

an axis of hinged attachment of the leg-bottom end of the central-platform first-end second-side leg to the proximate corner of the inside end and the second side of the first-end platform being parallel to an end of the central platform;

the central-platform second-end first-side leg has a leg-top end hinged to the central platform at a position proximate a corner of a second end and a first side of the central platform;

an axis of hinged attachment of the leg-top end of the central-platform second-end first-side leg to the proximate corner of the second end and the first side of the central platform being parallel to an end of the central platform;

the central-platform second-end second-side leg has a leg-top end hinged to the central platform at a position proximate a corner of a second end and a second side of the central platform;

an axis of hinged attachment of the leg-top end of the central-platform second-end second-side leg to the proximate corner of the second end and the second side of the central platform being parallel to an end of the central platform;

the central-platform second-end first-side leg has a leg-bottom end hinged to the second-end platform at a position proximate a corner of an outside end and a first side of the second-end platform;

an axis of hinged attachment of the leg-bottom end of the central-platform second-end first-side leg to the proximate corner of the inside end and the first side of the second-end platform being parallel to an end of the central platform.

the central-platform second-end second-side leg has a leg-bottom end hinged to the second-end platform at a position proximate a corner of an outside end and a second side of the second-end platform;

an axis of hinged attachment of the leg-bottom end of the central-platform second-end second-side leg to the proximate corner of the inside end and the second side of the second-end platform being parallel to an end of the central platform.

22. A convertible work creeper, seat and platform as described in claim 21 wherein:

the first-end platform has a width that is sized and shaped to fit designedly intermediate the central-platform first-end first-side leg and the central-platform first-end second-side leg when the creeper cum seat is in a creeper mode; and the second-end platform has a width that is sized and shaped to fit designedly intermediate the central-platform second-end first-side leg and the central-platform second-end second-side leg when the creeper cum seat is in a creeper mode.

23. A convertible work creeper, seat and platform as described in claim 22 wherein:

the central platform has a length that is designed to fit intermediate an inside end of the first-end platform and an inside end of the second-end platform when the creeper cum seat is in a creeper mode, such that the central platform rests on the at-least-one slide member when the first-end platform and the second-end platform are slid apart in a creeper mode and such that the central platform is positioned vertically above the first-end platform and the second-end platform when the first-end platform and the second-end platform are slid together and positioned edge-to-edge as shelf platform in a seat mode.

24. A convertible work creeper, seat and platform as described in claim 23 wherein:

combined length of the first-end platform and the second-end platform is designedly proportional to a design length of the central platform.

25. A convertible work creeper, seat and platform as described in claim 24 wherein:

the combined length of the first-end platform and the second-end platform is designedly greater in proportion to design length of the central platform, such that the shelf platform is designedly longer than the central platform to form a designedly truncate shape for structural stability of the creeper cum seat in a seat mode.

26. A convertible work creeper, seat and platform as described in claim 19 wherein:

the first slide rod and the second slide rod have design pluralities of sides; and the first-end rod slideway and the second-side rod slideway are designed to receive the first slide rod and the second slide rod respectively with designedly sliding snugness.

27. A convertible work creeper, seat and platform as described in claim 19 wherein:

the first slide rod and the second slide rod are cylindrical; and the first-end rod slideway and the second-side rod slideway are designed to receive the first slide rod and the second slide rod respectively with designedly sliding snugness.

28. A convertible work creeper, seat and platform as described in claim 8 wherein:

the first-end platform, the second-end platform and the central platform are padded.

*29. A convertible work creeper, seat and platform as described in claim 1 and further comprising:*

*an end fastener in fastening relationship between an inside end of the first-end platform and an inside end of the second-end platform with the creeper cum seat in a seat mode.*

*30. A convertible work creeper, seat and platform comprising:*

*a first-end platform and a second-end platform supported to allow horizontal travel of the first-end platform and the second-end platform between design positions of separation and general juxtaposed edge-to-edge positioning of the first-end platform and the second-end platform;*

*a central platform interconnected with the first-end platform and the second-end platform with the first-end platform and the second-end platform positioned at design extremities of separation to provide a creeper platform in a creeper mode of the creeper cum seat;*

*support members interconnecting said first-end and second-end platforms to said central platform in said creeper mode and a seat mode;*

*said support members including first legs having top ends hinged to the central platform and having bottom ends hinged to the first-end platform;*

*said support members including second legs having top ends hinged to the central platform and having bottom ends hinged to the second-end platform, such that the central platform is positional vertically above the first-end platform and the second-end platform juxtaposed generally edge-to-edge as a shelf platform with the first-end platform and the second-end platform slid to a seat mode of the creeper cum seat;*

*a slide attachment connected between said first-end and second-end platforms facilitating movement of said end platforms between said creeper and seat modes; and*

*mobile means carried on the first-end platform and the second-end platform.*

*31. A convertible work creeper, seat and platform as described in claim 30 wherein said first-end and second-end platforms include support frames and padded cushions carried on said support frames, and support means on bottoms of said support frames of the first-end and second-end platforms.*

*32. The creeper of claim 30 including a support surface carried on each of said first-end and said second-end platforms for supporting a worker in said creeper position.*

*33. A convertible work creeper, seat and platform comprising:*

*a first-end platform;*

*a second-end platform;*

*at least one slide member interconnecting said first-end and second-end platforms;*

*a central platform having a support surface, and said central platform having a first-end and a second-end;*

*seat-support members interconnecting said central platform with said first-end and said second-end platforms in a creeper mode and a seat mode;*

*said slide member having a length to accommodate a distance of sliding separation of the first-end platform and the second-end platform for positioning the central platform generally between the first-end platform and the second-end platform to provide a body-support platform in said creeper mode; and*

*said seat-support members having a length to support the central platform as a seat in a horizontal attitude vertically above the first-end platform and the second-end platform with the first-end platform and the second-end platform juxtaposed generally edge-to-edge as a shelf platform vertically below the central platform as a seat in said seat mode of the creeper cum seat.*

*34. A convertible work creeper, seat and platform as described in claim 33 and further comprising:*

*at least one seat-mode latch having latching attachment of the first-end platform to the second-end platform for maintaining the first-end platform and the second-end platform juxtaposed detachably in edge-to-edge relationship in a seat mode.*

*35. A convertible work creeper, seat and platform as described in claim 33 wherein said first-end and second-end*

*platforms include support frames, padded cushions carried on said support frames, and support means on bottoms of said support frames of the first-end and second-end platforms.*

*36. A convertible work creeper, seat and platform as described in claim 35 wherein the support means are casters.*

*37. A convertible work creeper, seat and platform as described in claim 33 comprising a headrest positioned proximate an end of a top surface of an end platform.*

*38. A convertible work creeper, seat and platform as described in claim 33 wherein the central platform has a length that is designed to fit intermediate an inside end of the first-end platform and an inside end of the second-end platform when the creeper cum seat is in a creeper mode, such that the central platform rests on the at-least-one slide member when the first-end platform and the second-end platform are slid apart in a creeper mode and such that the central platform is positioned vertically above the first-end platform and the second-end platform when the first-end platform and the second-end platform are slid together and positioned edge-to-edge as shelf platform in a seat mode.*

*39. A convertible work creeper, seat and platform as described in claim 38 wherein a combined length of the first-end platform and the second-end platform is designedly proportional to a design length of the central platform.*

*40. A convertible work creeper, seat and platform as described in claim 39 wherein a combined length of the first-end platform and the second-end platform is designedly greater in proportion to design length of the central platform, such that the shelf platform is designedly longer than the central platform to form a designedly truncate shape for structural stability of the creeper cum seat in a seat mode.*

*41. The creeper of claim 33 including a support surface carried on each of said first-end and said second-end platforms for supporting a worker in said creeper position.*

*42. A convertible work creeper used by a worker, said creeper transforming between a horizontal position for supporting the worker in a supine position in a creeper mode and a seat position for supporting the worker working in a upright seating position in a seating mode, said creeper comprising:*

*a first-end platform;*

*a second-end platform supported with said first-end platform so that said first-end and second-end platforms are allowed to move in horizontal travel relative to each other;*

*said first-end platform and said second-end platform having horizontally separated position when said work creeper is in a creeper mode, and said first-end platform and said second-end platform having a generally edge-to-edge position when the first-end and second-end platforms are in a seat mode;*

*a central platform interconnected with said first-end platform and said second-end platform;*

*said central platform having a lowered position in which said central platform, said first-end platform, and said second-end platform provide a body support platform in said creeper mode;*

*said central platform having a raised seat position in which said central platform provides a seat for the worker when said first-end platform and said second-end platform are in said seat mode; and*

*a slide attachment connected between said first-end and second-end platforms facilitating movement of said first-end and second-end platforms between said creeper and seat modes.*

*43. The creeper of claim 42 included support members interconnecting said first-end and said second-end platforms to said central platform in said creeper mode and said seat mode.*

*44. The creeper of claim 43 wherein support members include pivotal legs having top ends hinged to said central platform and bottom ends hinged to said first-end platform;*

*said support members including second pivotal legs having top ends hinged to said central platform and bottom ends hinged to said second-end platform; and*

*said support members having a raised position when said central platform is in said seat mode and a lowered position when said central platform is in said creeper mode.*

*45. The creeper of claim 42 including a support surface carried on each of said first-end and said second-end platforms for supporting a worker in said creeper position.*

* * * * *